(12) United States Patent
Lee et al.

(10) Patent No.: US 11,931,820 B2
(45) Date of Patent: Mar. 19, 2024

(54) SWAPPABLE RETRACTABLE TOOL TIP (SRTT)

(71) Applicant: MERCURY MISSION SYSTEMS, LLC, Andover, MA (US)

(72) Inventors: Kang Lee, Torrance, CA (US); Matthew Neil, Torrance, CA (US); Wayne Chan, Torrance, CA (US); Anthony Lai, Torrance, CA (US); Andrew Kostrzewski, Torrance, CA (US)

(73) Assignee: MERCURY MISSION SYSTEMS, LLC, Andover, MA (US)

( * ) Notice: Subject to any disclaimer, the term of this patent is extended or adjusted under 35 U.S.C. 154(b) by 427 days.

(21) Appl. No.: 17/125,692

(22) Filed: Dec. 17, 2020

(65) Prior Publication Data

US 2021/0178510 A1 Jun. 17, 2021

Related U.S. Application Data

(60) Provisional application No. 62/949,050, filed on Dec. 17, 2019.

(51) Int. Cl.
*B23K 20/00* (2006.01)
*B23K 20/12* (2006.01)
*G05B 19/414* (2006.01)

(52) U.S. Cl.
CPC ........ *B23K 20/1255* (2013.01); *B23K 20/123* (2013.01); *G05B 19/4145* (2013.01)

(58) Field of Classification Search
CPC ............. B23K 20/125; B23K 20/1255; B23K 20/123; B23K 20/126; B23K 20/1265;
(Continued)

(56) References Cited

U.S. PATENT DOCUMENTS 3,002,496 A * 10/1961 Manchester .......... B23B 31/302
  92/101
3,023,740 A * 3/1962 Samuel, Jr. ........... F15B 15/261
  91/401
(Continued)

FOREIGN PATENT DOCUMENTS

JP     2005199281 A  *  7/2005
ZA      200409293 A  *  9/2005

OTHER PUBLICATIONS

JP2005-199281 computer english translation (Year: 2023).*

*Primary Examiner* — Erin B Saad
(74) *Attorney, Agent, or Firm* — Sheppard, Mullin, Richter & Hampton LLP

(57) ABSTRACT

Systems and techniques are directed to a Swappable Retractable Tool Tip (SRTT), which is designed as a next generation of friction stir welding tools and retractable tool tips. The disclosed SRTT may be "swappable," having different types of retractable tool tips that can be assembled and employed as a part of the SRTT. A SRTT system can include at least: a blank tool holder, a piston, and a retractable tool tip. In operation, the blank tool holder allows air to flow to cause movement of the piston and the retractable tool tip. For example, compressed air can push up on the piston and the retractable tool tip, retracting it into a "home" position inside of the blank tool holder. Also, the SRTT can include springs that push down on the piston and the retractable tool tip, extending the tip into an "extended" position outside of the blank tool holder.

15 Claims, 12 Drawing Sheets

(58) Field of Classification Search
CPC . B23K 20/124; B23K 20/1245; B23K 20/127
See application file for complete search history.

(56) References Cited

U.S. PATENT DOCUMENTS

| | | | | |
|---|---|---|---|---|
| 3,065,736 A * | 11/1962 | Demay | ..................... | F15B 9/08 91/376 R |
| 3,082,792 A * | 3/1963 | Jenkins | .................. | F15B 15/10 92/101 |
| 3,273,676 A * | 9/1966 | Thirion | ............... | F16D 65/0979 188/73.35 |
| 5,697,544 A * | 12/1997 | Wykes | ................. | B23K 20/125 228/2.1 |
| 5,713,507 A * | 2/1998 | Holt | ..................... | B23K 20/125 228/234.1 |
| 6,299,050 B1 * | 10/2001 | Okamura | ............. | B23K 20/125 228/2.1 |
| 6,336,393 B1 * | 1/2002 | LeMire | .................. | F16C 33/20 92/88 |
| 6,732,900 B2 * | 5/2004 | Hansen | ............... | B23K 20/125 228/2.1 |
| 6,799,708 B2 * | 10/2004 | von Strombeck | . | B23K 20/1205 228/49.4 |
| 7,677,427 B2 * | 3/2010 | Fukuhara | ............. | B23K 20/125 228/2.1 |
| 8,434,660 B2 * | 5/2013 | Burton | ................ | B23K 20/125 228/2.1 |
| 8,714,431 B2 * | 5/2014 | Roos | ................. | B23K 20/1265 228/2.1 |
| 10,022,817 B2 * | 7/2018 | Maruko | ............. | B23K 20/1255 |
| 10,092,975 B2 * | 10/2018 | Twelves, Jr. | ....... | B23K 20/1215 |
| 11,453,083 B2 * | 9/2022 | Choi | .................... | B23K 20/128 |
| 2005/0180829 A1 * | 8/2005 | Lawson | .................. | B23B 31/08 409/140 |
| 2006/0032887 A1 * | 2/2006 | Haynie | ................ | B23K 20/125 228/2.1 |
| 2006/0213954 A1 * | 9/2006 | Ruther | ................... | B21J 15/027 228/114.5 |
| 2007/0228104 A1 * | 10/2007 | Mankus | ............... | B23K 20/125 228/101 |
| 2008/0084018 A1 * | 4/2008 | Baumann | ................ | B23Q 3/16 269/271 |
| 2008/0112768 A1 * | 5/2008 | Matlack | ................... | B23Q 3/16 408/1 BD |
| 2011/0135416 A1 * | 6/2011 | Fry | ...................... | B23Q 17/003 409/232 |
| 2011/0274943 A1 * | 11/2011 | Fujii | .................. | B23K 20/1255 228/2.1 |
| 2012/0298727 A1 * | 11/2012 | Stol | .................... | B23K 20/1245 228/2.1 |
| 2013/0186937 A1 * | 7/2013 | Burton | ................ | B23K 20/124 228/2.1 |
| 2013/0255884 A1 * | 10/2013 | Baumann | ............... | B32B 38/18 228/2.1 |
| 2014/0080690 A1 * | 3/2014 | Noma | ................... | B25J 11/005 483/55 |
| 2014/0217151 A1 * | 8/2014 | Miyahara | ............... | B23K 20/12 228/2.1 |
| 2015/0143686 A1 * | 5/2015 | Blacket | ................ | F16D 57/002 29/243.526 |
| 2016/0325342 A1 * | 11/2016 | Gostylla | ............. | B23K 26/352 |
| 2020/0376590 A1 * | 12/2020 | Weigl | ................. | B23K 20/1255 |
| 2021/0008658 A1 * | 1/2021 | Frank | .................... | B23K 20/00 |
| 2021/0178510 A1 * | 6/2021 | Lee | ...................... | B23K 20/125 |
| 2021/0402505 A1 * | 12/2021 | Choi | .................... | B23K 20/128 |

* cited by examiner

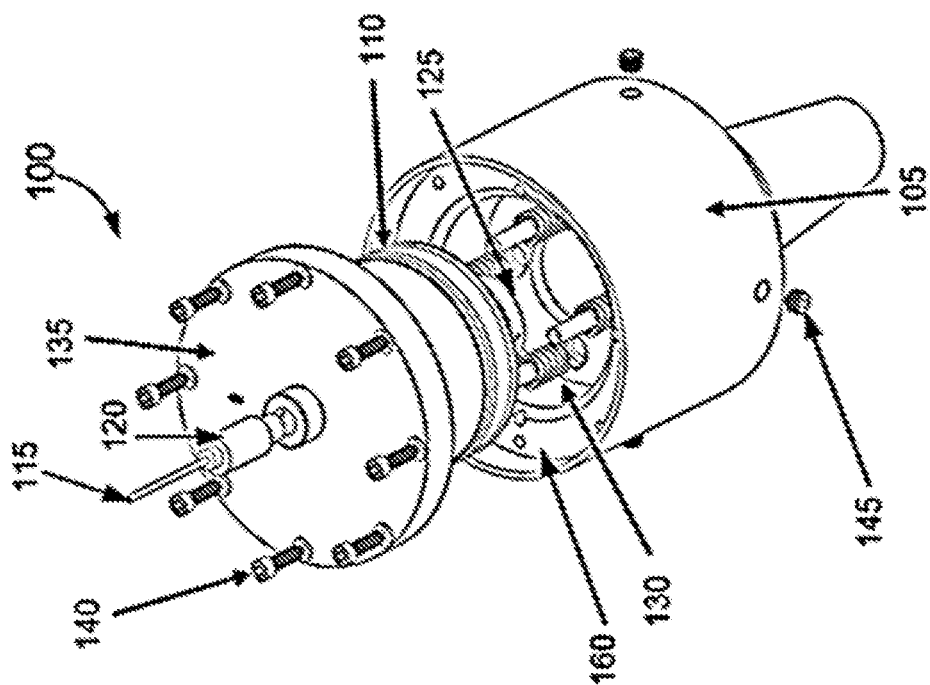
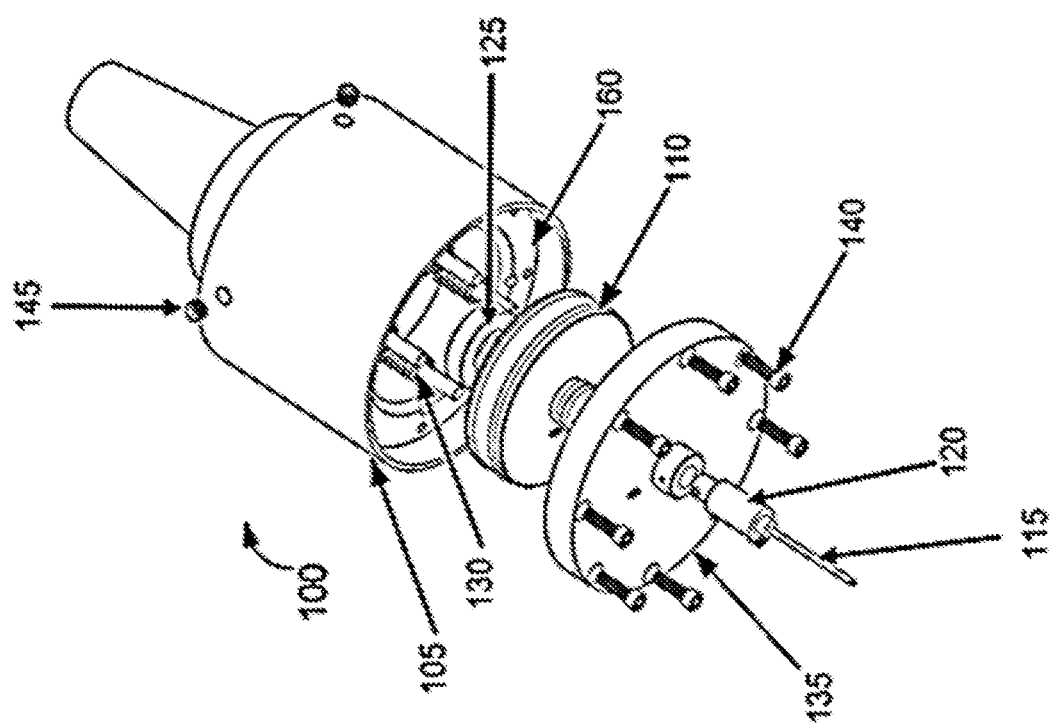
FIG. 1B
FIG. 1A

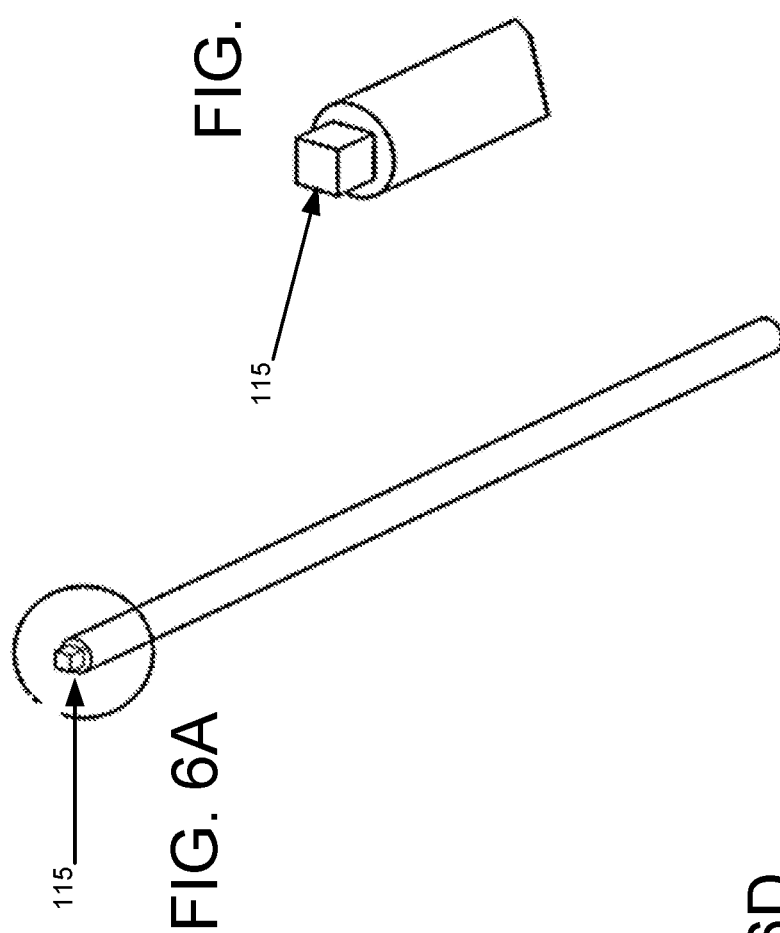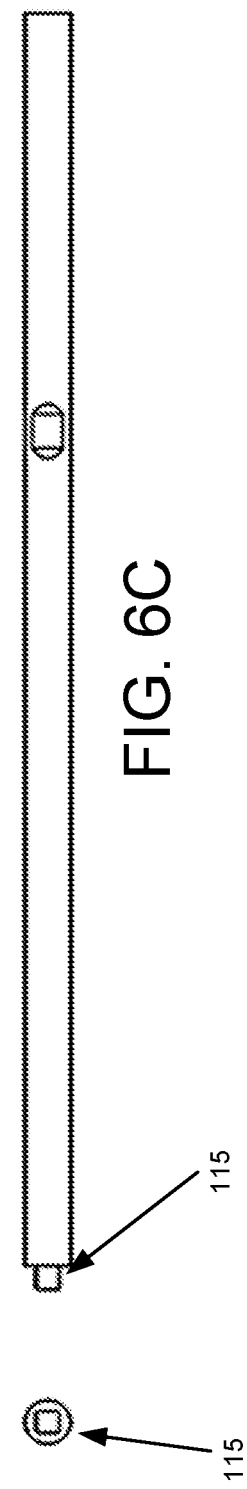

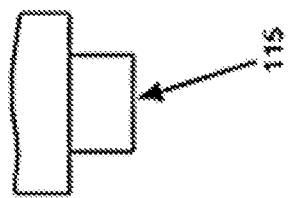
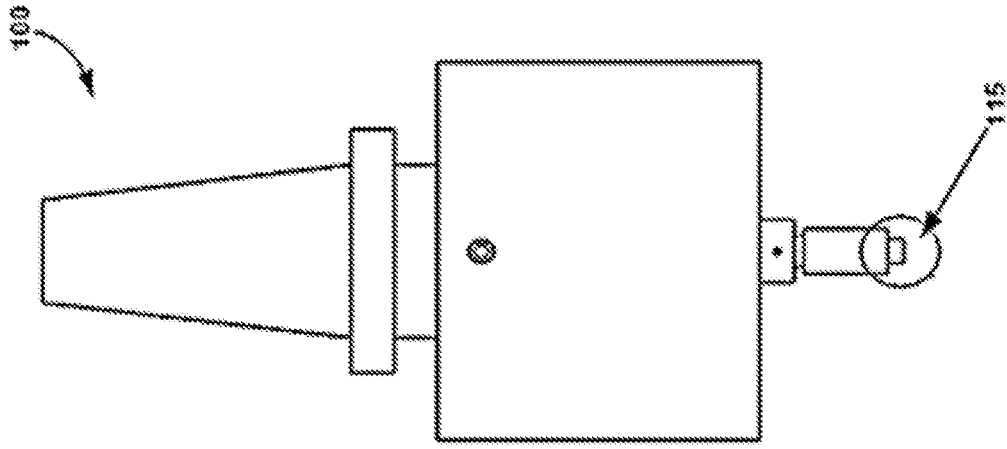
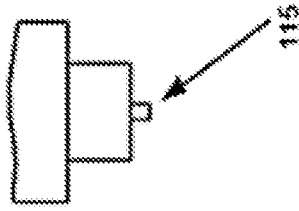
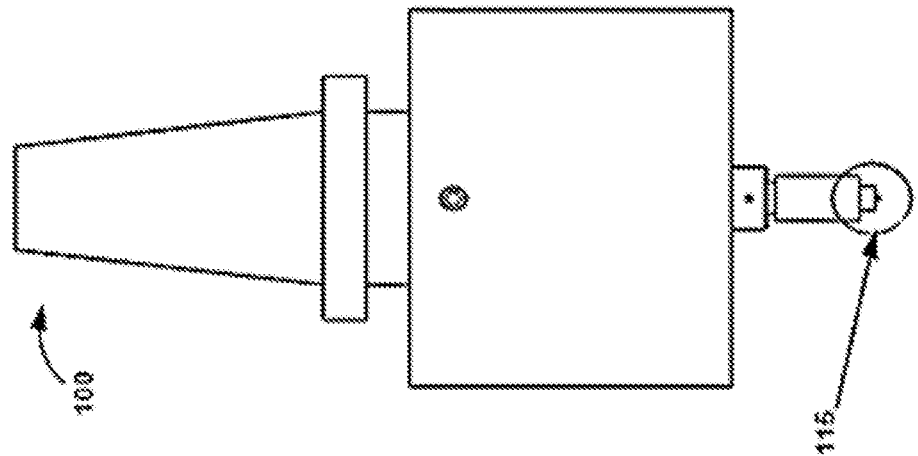

SWAPPABLE RETRACTABLE TOOL TIP (SRTT)

RELATED APPLICATIONS

This application claims the benefit of U.S. Provisional Patent Application No. 62/949,050, filed on Dec. 17, 2019, the contents of which are incorporated herein by reference in their entirety.

STATEMENT REGARDING FEDERALLY SPONSORED R&D

This invention was made with government support with MDA Robobond II, Grant No. HQ0147-18-C-7304, awarded by the Missile Defense Agency (MDA). The government has certain rights in the Invention.

DESCRIPTION OF RELATED ART

Current state of the art friction stir-welding tool holders allows for large scale and large work pieces to be welded together through friction stir welding. There are disadvantages of the current state of the art friction stir-welding tool holders. One disadvantage is that these current tools leave a keyhole feature after the tool holder is removed from the welding work pieces. Another disadvantage is that these tools are typically only able to weld large, thick work pieces.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 1A illustrates an example of a Swappable Retractable Tool Tip (SRTT) in an exploded view at a perspective, according to some embodiments.

FIG. 1B illustrates the example of the SRTT in an exploded view at a different perspective, according to some embodiments.

FIG. 6A illustrates an example of a retractable tool tip element of the SRTT at a perspective view, according to some embodiments.

FIG. 6B illustrates the example of the retractable tool tip element of the SRTT at close up view, according to some embodiments.

FIG. 6C illustrates the example of the retractable tool tip element of the SRTT at a side view, according to some embodiments.

FIG. 6D illustrates the example of the retractable tool tip element of the SRTT at a top view, according to some elements.

FIG. 8A illustrates an example of the retractable tool tip element of the SRTT in an "extend" state at a side view, according to some embodiments.

FIG. 8B illustrates the example of the retractable tool tip element of the SRTT in the "extended" state at a close up view, according to some embodiments.

FIG. 8C illustrates the example of the retractable tool tip element of the SRTT in a "home" state at a side view, according to some embodiments.

FIG. 8D illustrates the example of the retractable tool tip element of the SRTT in a "home" state at a close up view, according to some embodiments.

Figure 2C:
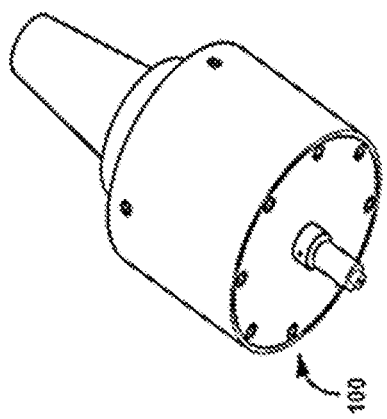
FIG. 2C illustrates the example of the SRTT in the assembled configuration at a perspective view, according to some embodiments.

The figures are not exhaustive and do not limit the present disclosure to the precise form disclosed.

DETAILED DESCRIPTION

Embodiments of the disclosed technology represent a next generation of friction stir welding tools and retractable tool tips. The disclosed Swappable Retractable Tool Tip (SRTT) may be "swappable" in such a sense that it includes various tool tips (and may use conventional tool tips). Accordingly, embodiments may be implemented that are reconfigurable within the same type of device, including, at least, two (forms) such as: a conventional friction stir welding tool holder and a swappable retractable tool tip friction stir welding tool holder.

Embodiments of the disclosed welding tool holders may be different from prior art friction stir welding tool holders in that they have a swappable (e.g., interchangeable) tool tip that can retract into the tool holder.

An example SRTT 100, shown in FIG. 1A and FIG. 1B for example, includes multiple springs with dowel pins (e.g., four springs and four dowel pins although other quantities can be used) that help guide and lock the piston (that also contains the swappable tool tip) in place during the friction stir welding process. Utilizing compressed air such as from a Computer Numerical Control (CNC) machine, a piston and a retractable tool tip (in combination) of the SRTT 100 may act like a pneumatic cylinder, with the compressed air pushing the piston/tip combination into a blank tool holder and retract the tip away from the shoulder, which may be fixed in place.

Embodiments of the SRTT 100 may also be configured so that retractable tool tips may be swapped based on the material being welded along with the size of the work piece being welded. This may be accomplished in some configurations be in which the tool tip is assembled with the piston via a set screw that allows a wide range of tool tips to be swapped in place.

One advantage of some embodiments of the SRTT 100 is the ability to work with any type of work piece, whether it is a small (e.g., thin) work piece that requires a small tool tip and a small shoulder; or a large scale work pieces that require a larger shoulder and a larger, longer tool tip. Various geometries and features can be added or removed from the retractable tool tip and the shoulder, depending on the design of the work piece that will need to be welded.

Not only will embodiments of the SRTT 100 be able to weld various work pieces of varying shapes and thicknesses, they will also be able to remove the keyhole. This may be achieved by including a retractable tool tip that is fixed with a piston. Compressed air may be used help push the piston up inside of the modified tool holder, pushing the retractable tool tip with it while maintaining the shoulder in place to fill in the keyhole that is left behind in the work piece.

Referring now to FIG. 1A and FIG. 1B, exploded views of an example of the swappable retractable tool tip (SRTT) 100 are illustrated at different perspective views. The elements shown in the example of FIG. 1A and FIG. 1B include: a modified blank tool holder 105; a piston 110; a retractable tool tip 115; a shoulder 120; a ring stopper 125; springs & dowel pins 130; a cover plate 135; screws 140; fittings 145; and an end cap 160.

According to the embodiments, the modified blank tool holder 105 comprises the main mechanical housing for the SRTT 100. The modified blank tool holder 105 can have multiple through holes (e.g., four holes) to direct air from the top of the tool holder into the mechanical housing, thereby pushing the piston 110 and the retractable tool tip 115 up, which causes the tool tip to retract. The modified blank tool holder 105 can also include at least one relief hole, which is included in a counterbore that contains the piston 110 in order to relieve the air coming into this element.

As seen in the examples of FIG. 1A and FIG. 1B, the SRTT 100 also includes the piston 110. The piston can comprise multiple counterbores (e.g., four counterbores) that are used to accept the springs & dowel pins 130 into place. The top of the piston 110 is also threaded to be assembled with the ring stopper 125 attached thereto. The piston 110 can include multiple grooves (e.g., two grooves) that accept O-rings in order to seal the piston 110. The retractable tool tip 115 can be assembled into the piston 110 via a through hole inside of the piston 110, which is then fixed into the piston 110 through a set screw.

Also, the SRTT 100 includes the retractable tool tip 115. For example, this retractable tool tip 115 assembles together with the piston 110 and the shoulder 120, and locks into place with the piston 110 through a set screw. Further, according to some embodiments, the geometry and length of the retractable tool tip 115 are adjustable dimensions. By adjusting the dimensions of the retractable tool tip 115, the retractable tool tip 115 can be optimally configured based on welding requirements for the workpiece being welded.

FIG. 1A and FIG. 1B additionally show the shoulder 120 of the SRTT 100. The shoulder 120 can remain fixed in place through a set screw into the cover plate 135. The geometry and features of the shoulder 120 can also be adjustable dimensions that are based on the design requirements for the workpiece being welded.

The SRTT 100 can also include the ring stopper 125. The ring stopper 125 fastens with the piston 110. The ring stopper 125 is configured to stop the piston 110 from pushing too far into the modified blank tool holder 105, when compressed air pushes the piston 110 up. One or more set screws can be used to lock the ring stopper 125 in place to prevent it from spinning, for example during the friction stir welding process.

FIG. 1A and FIG. 1B shows multiple springs & dowel pins 130. In the example configuration, the SRTT 100 contains four springs and dowel pins 130. These springs & dowel pins 130 can be used to return the piston 110 and the retractable tool tip 115 to their resting position, for instance when the external force pushing on these elements (from the compressed air) is removed from the system through the relief holes in the modified blank tool holder 105.

Cover plate 135 is also illustrated in FIG. 1A and FIG. 1B. As a general description, the cover plate 135 encloses the entire system of the SRTT 100 together. The cover plate 135 can contain a large single hole where the shoulder 120 can be assembled thereto. In the example, the cover plate 135 comprises eight screw holes to fasten the cover plate 135 to the modified blank tool holder 105. The cover plate 135 can also have one or more screw holes that are used to fasten the shoulder 120 thereto.

In the example configuration, the SRTT 100 includes multiple screws 140 (e.g., eight screws 140). The screws 140 can be arranged and secured to fastens the cover plate 135 to the modified blank tool holder 105.

The SRTT 100 can include multiple fittings 145. The fittings 145 can be particularly used to seal the system of the SRTT 100, and direct the compressed air into the counterbore of the modified blank tool holder 105. According to an example, the SRTT 100 can include four fittings 145, where at least one of the fittings 145 has a vented hole.

Figure 2A:
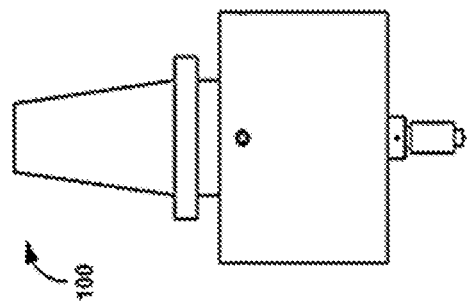
FIG. 2A illustrates an example of the SRTT in an assembled configuration at a side view, according to some embodiments.
Figure 2B:
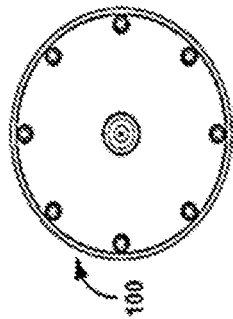
FIG. 2B illustrates the example of the SRTT in the assembled configuration at a top view, according to some embodiments.

FIG. 2 illustrates an example of the SRTT 100 in an assembled configuration. For example, when all of the elements that are described in detail with reference to FIG. 1A and FIG. 1B are assembled together, the SRTT 100 is arranged as seen in FIG. 2.

Figure 3:
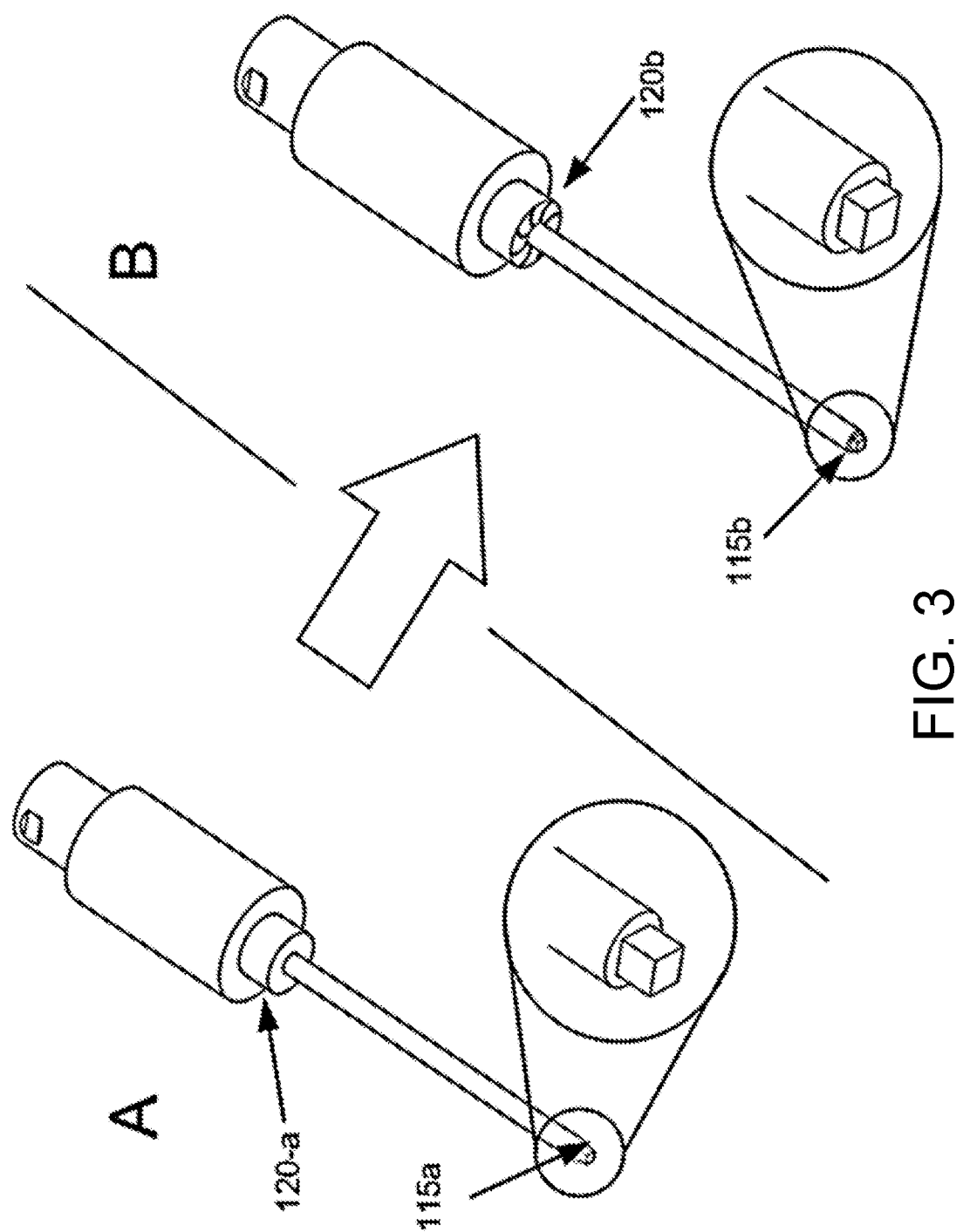
FIG. 3 illustrates an interchangeability between retractable tool tips and shoulders as elements of the SRTT, according to some embodiments.

FIG. 3 illustrates the interchangeability (also referred to herein as "swappability") feature of the SRTT 100. In particular, the SRTT 100 can be designed to allow for swappability between, at least, the type of retractable tool tip 115 and the type of shoulder 120 that are assembled and employed as a part of the system.

The SRTT swappability feature and the retractability may be manifested in various configurations by the fact that the retractable tool tip 115a can be swapped out with a different retractable tool tip 115b designed for a different workpiece that will be welded. This may include swapping tooltips to accommodate workpieces of different thicknesses. In various implementations, the shoulder 120 can also be swapped out, allowing for different features to be designed onto the face of the shoulder 120, creating the ability to customize the SRTT 100 into various configurations that can be suited for different friction stir welding applications, as shown in FIG. 3.

FIG. 3 illustrates an example of a retractable tool tip 115*a* that is configured to swap between a different retractable tool tip 115*b*. For instance, the retractable tool tip 115*a* can have be longer in length than the retractable tool tip 115*b*. FIG. 3 also shows that the SRTT 100 is configured with the ability to interchange and swap between a shoulder 120*a* and a different shoulder 120*b* having differing design and dimensions.

The different geometries and the lengths corresponding to each of the retractable tool tips 115*a*, 115*b* respectively, along with features corresponding to each of the shoulders 120*a*, 120*b* respectively, can be designed and then swapped when necessary for the SRTT 100. FIG. 3 shows that the SRTT 100 is swapped from a first configuration, being assembled with the retractable tool tip 115*a* having a design that is longer, and the shoulder 120*a* having a design with a flat face (with no grooves). In the second configuration, those elements are interchanged in order to assemble the SRTT 100 with a different type of retractable tool tip 115*b* having a shorter tool tip design, and with a different shoulder 120*b* that includes grooves designed into the flat face.

Figure 4B:
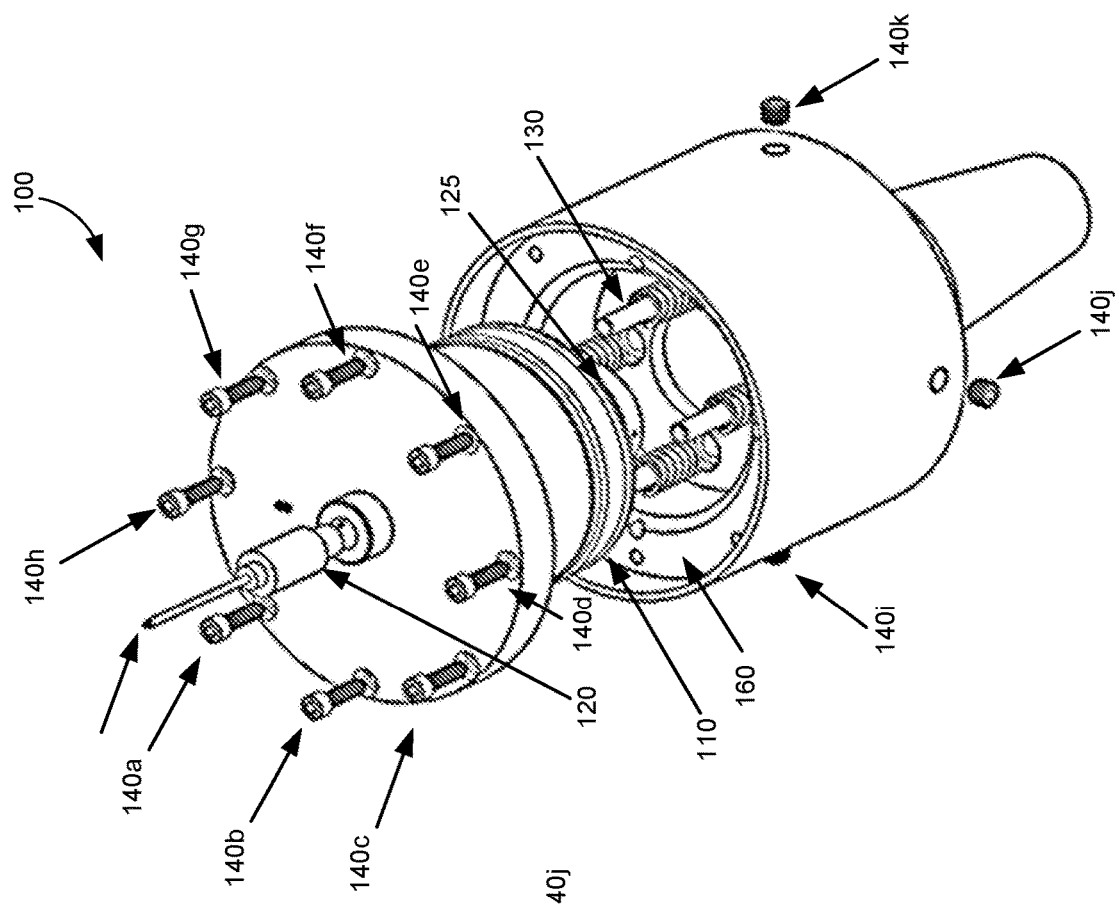
FIG. 4B illustrates the example of assembling the SRTT at a different perspective view, according to some embodiments.
Figure 4A:
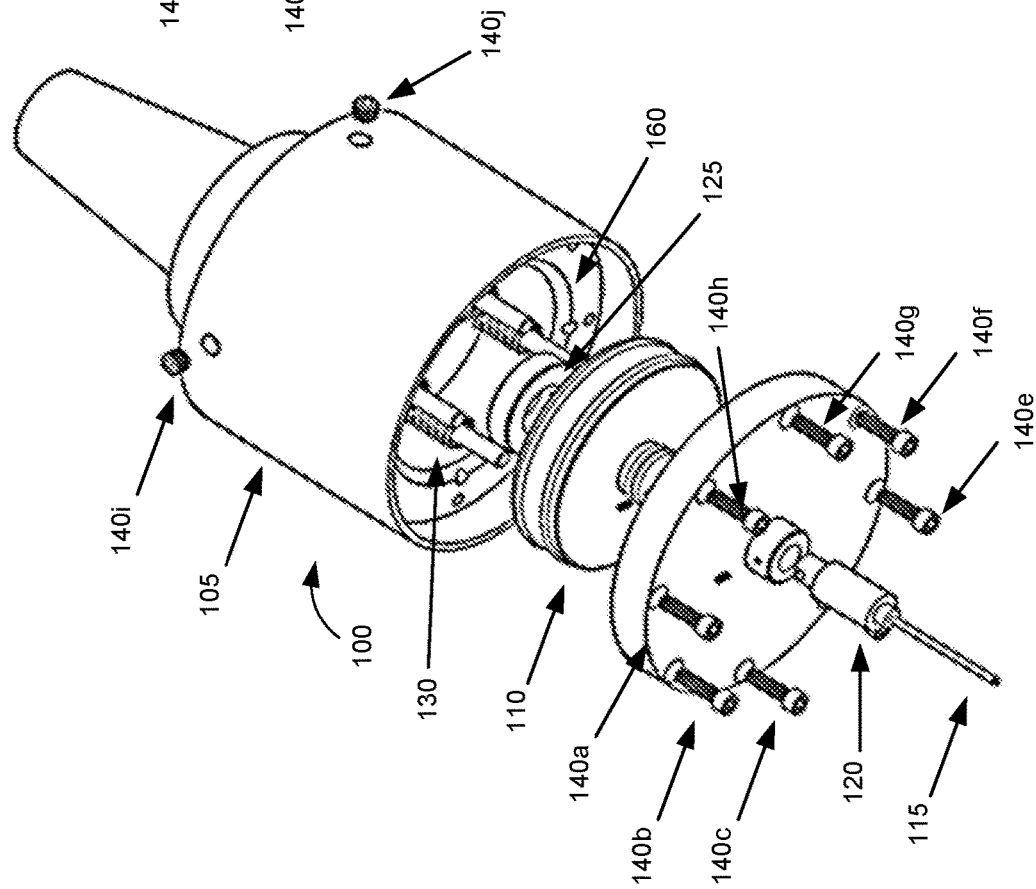
FIG. 4A illustrates an example of assembling the SRTT at a perspective view, according to some embodiments.

Referring now to FIG. 4A and FIG. 4B, each displays an example of assembling the SRTT 100 at a perspective view. In other words, FIG. 4A and FIG. 4B illustrate a main assembly of an example SRTT 100. A friction stir welding tool holder shown in this example includes: a modified tool holder blank 105; a piston 110; a ring stopper 125; a retractable tool tip 115; a fixed shoulder 120; an end cap 160; compression springs & dowel pins 130; and screws 140*a*-140*k*.

Figure 5B:
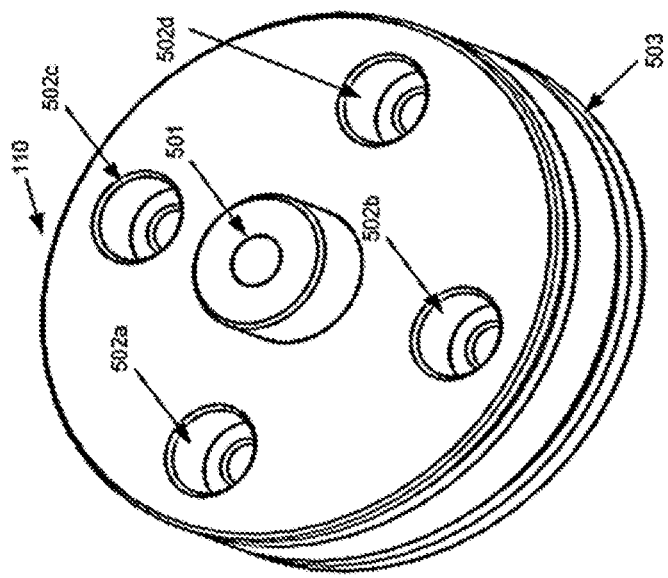
FIG. 5B illustrates the example of the piston element of the SRTT at a different perspective view, according to some embodiments.
Figure 5A:
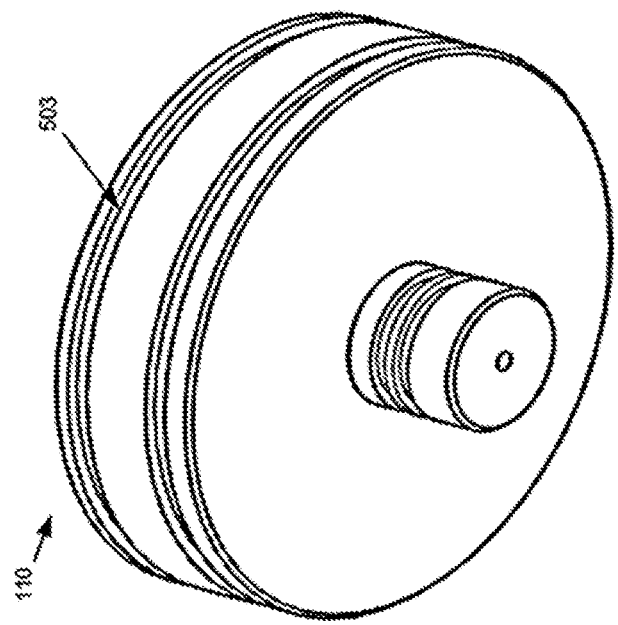
FIG. 5A illustrates an example of a piston element of the SRTT at a perspective view, according to some embodiments.

FIG. 5A and FIG. 5B illustrate an example design of a piston 110 that can be used with the SRTT (shown in FIG. 1A) at different perspective views. In FIG. 5B, the design for the piston 110 is shown to include a long through hole 501 to accept the retractable tool tip upon assembly. Counterbores 502*a*-502*d* are also present to accept the compression springs and the dowel pins (shown in FIG. 1A). The top of the piston 110 is configured to accommodate a ring stopper (shown in FIG. 1A). In this example, the piston also includes grooves 503 to allow O-rings to be placed around the piston 110 to provide a seal.

FIG. 6A illustrates an example of a retractable tool tip 115 of the SRTT at a perspective view. FIG. 6B illustrates the example of the retractable tool tip 115 of the SRTT at close up view. FIG. 6C illustrates the example of the retractable tool tip 115 of the SRTT at a side view. FIG. 6D illustrates the example of the retractable tool tip 115 of the SRTT at a top view.

In some embodiments, the tip itself of the retractable tool tip 115 can be adapted from conventional friction stir welding tool tips, including: the tip geometry; and the tip length. In various other embodiments, other tip geometries and tip lengths are also possible, depending on the workpiece(s) with which the SRTT is going to be used. In the examples of FIG. 6A-FIG. 6D, the tip of the retractable tool tip 115 is shown having the same geometry to emphasize interchangeability of SRTT.

Figure 7B:
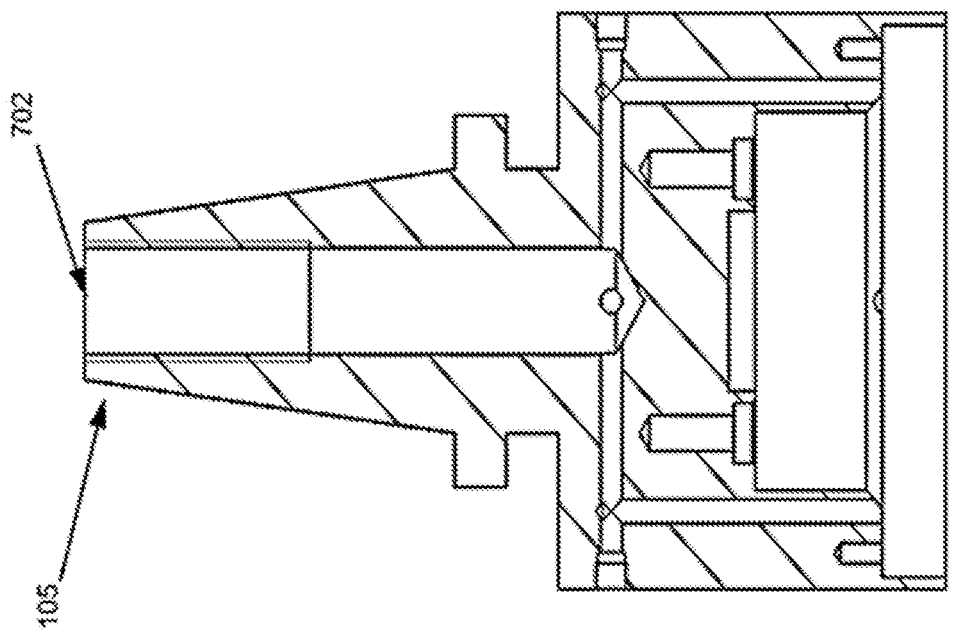
FIG. 7B illustrates the example of the modified blank tool holder of the SRTT at a cross-section view, according to some embodiments.
Figure 7A:
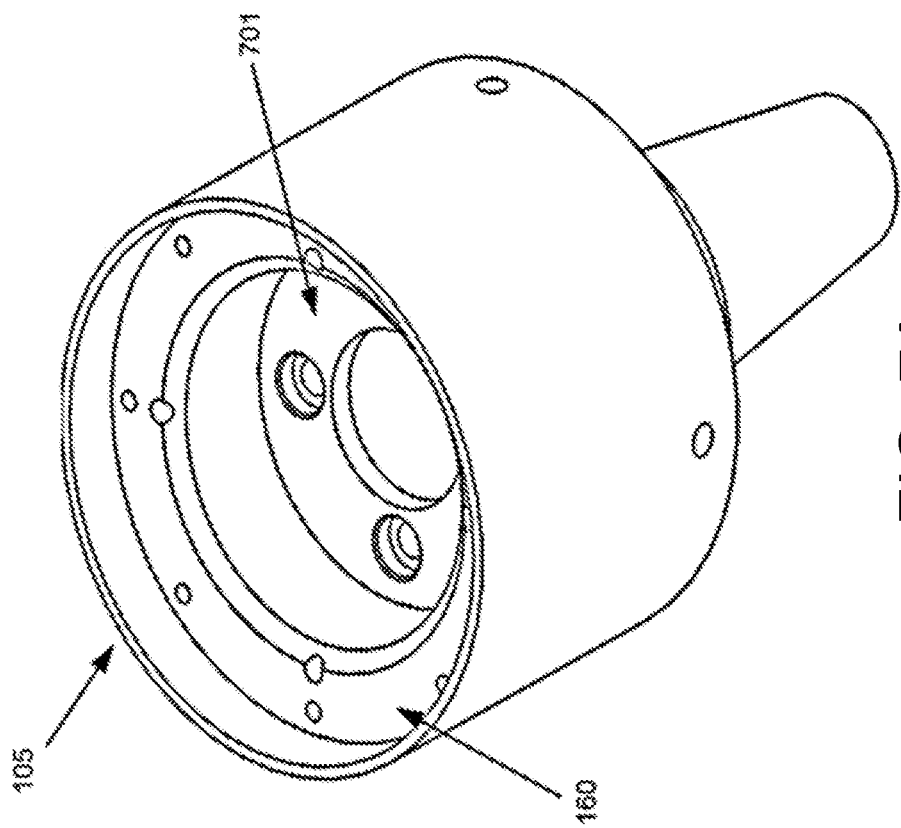
FIG. 7A illustrates an example of a modified blank tool holder of the SRTT at a perspective view, according to some embodiments.

Referring now to FIG. 7A illustrates an example of a modified blank tool holder 105 at a perspective view. FIG. 7B illustrates the example of the modified blank tool holder 105 at a cross-sectional view. As seen in FIG. 7A, the modified blank tool holder 105 can include counterbores 701 to fit the piston (shown in FIG. 1A) and the end cap (shown in FIG. 1A). The modified blank tool holder 105 can also include through holes 702, which are employed in order to route compressed air into the modified blank tool holder 105 to push the piston up.

FIG. 8A illustrates another example of the retractable tool tip 115 of the SRTT in an "extend" state at a side view. FIG. 8B shows the example of the retractable tool tip 115 of the SRTT in the "extended" state at a close up view. Alternatively, FIG. 8C illustrates an example of the retractable tool tip 115 of the SRTT in a "home" state at a side view. FIG. 8D also shows the example of the retractable tool tip 115 of the SRTT in the "home" state, but at a close up view. FIG. 8 shows SRTT's retractable tool tip in two states (two views). In the "extended" state, shown in FIG. 8A for instance, the tip of the retractable tool tip 115 can be extended due to the compression springs pushing down on the piston (shown in FIG. 1A) where the tool tip is assembled. In contrast, when compressed air is pushing on the piston, the tip of the retractable tool tip 115 will go into its "home" state, for example as seen in FIG. 8C, retracting into the SRTT assembly.

Figure 9B:
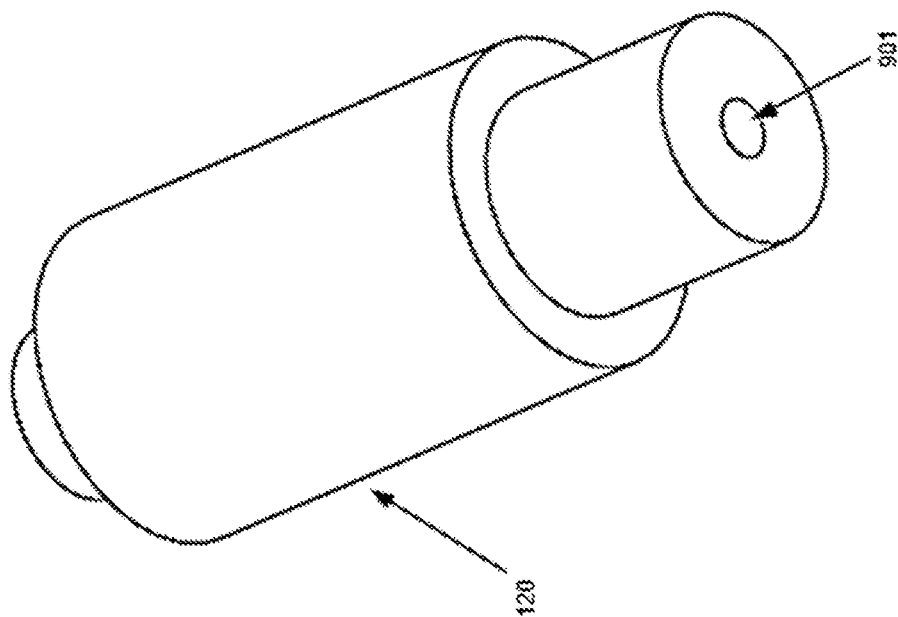
FIG. 9B illustrates the example of the shoulder element of the SRTT at a different perspective view, according to some embodiments.
Figure 9A:
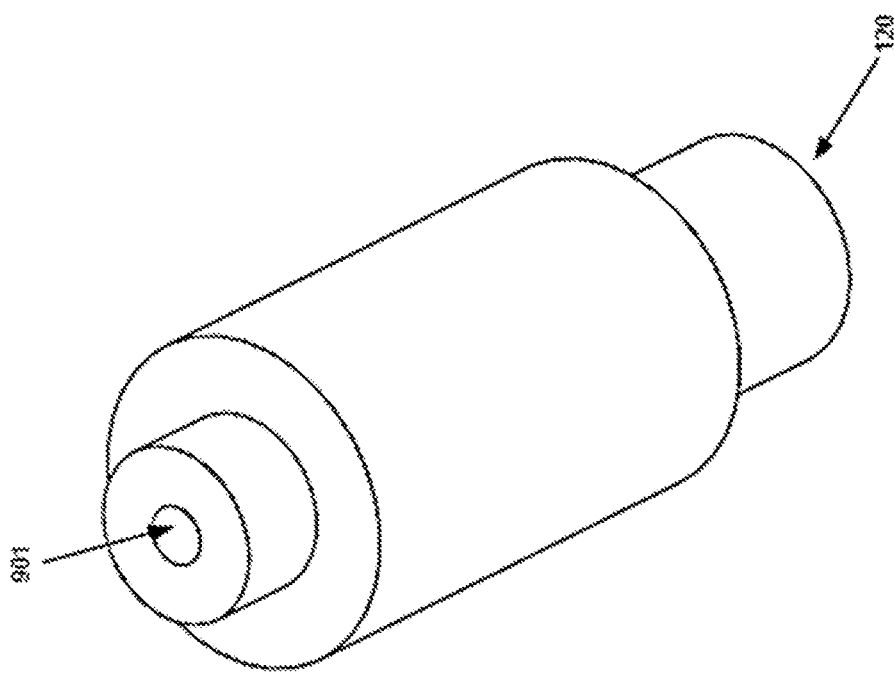
FIG. 9A illustrates an example of a shoulder element of the SRTT at a perspective view, according to some embodiments.

In FIG. 9A and FIG. 9B, an example of a fixed shoulder 120 is shown at different perspective views. A through hole 901 is shown, where the retractable tool tip can freely move from its "extended" state to its "home" state. In FIG. 9B, the face of the design is prominently shown, which can be altered to include additional features, depending on the work pieces that will be welded together.

Figure 10:
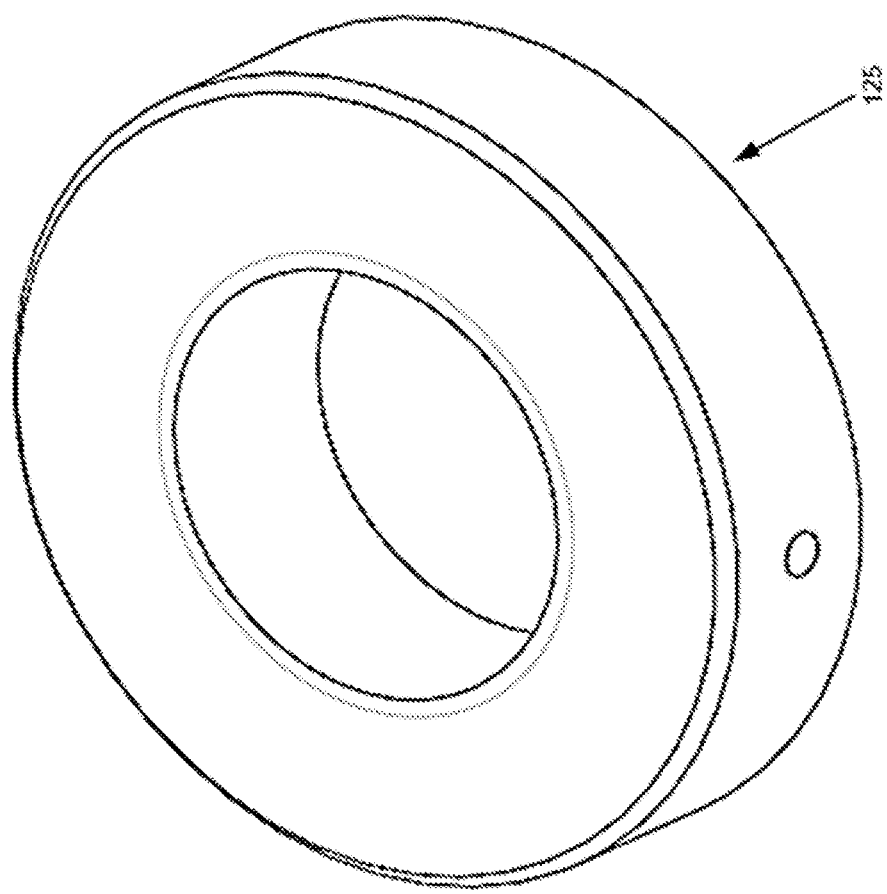
FIG. 10 illustrates an example of an adjustable ring stopper element of the SRTT at a perspective, according to some embodiments.

Referring now to FIG. 10, an example of a ring stopper 125 design is illustrated. The ring stopper 125 can be configured to fasten into the piston (shown in FIG. 1A). This is to adjust how far the piston will retract when compressed air pushes on it, therefore adjusting how far the retractable tool tip (shown in FIG. 1A) will go into its "home" state.

Figure 11B:
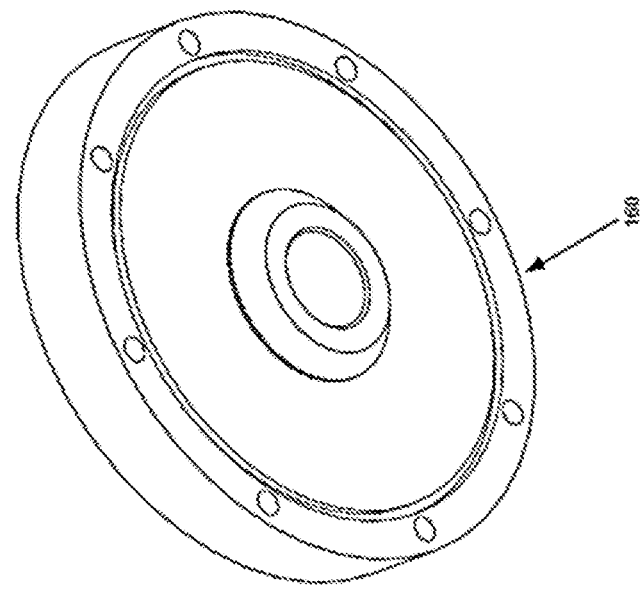
FIG. 11B illustrates the example of the end cap element of the SRTT at a different perspective, according to some embodiments.
Figure 11A:
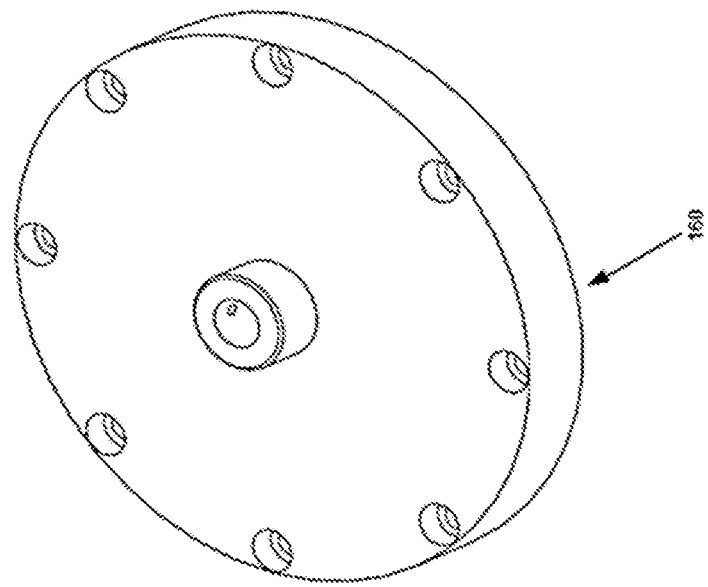
FIG. 11A illustrates an example of an end cap element of the SRTT at a perspective view, according to some embodiments.

FIG. 11A and FIG. 11B show an example of an end cap 160 of the SRTT at different perspective views.

Figure 12:
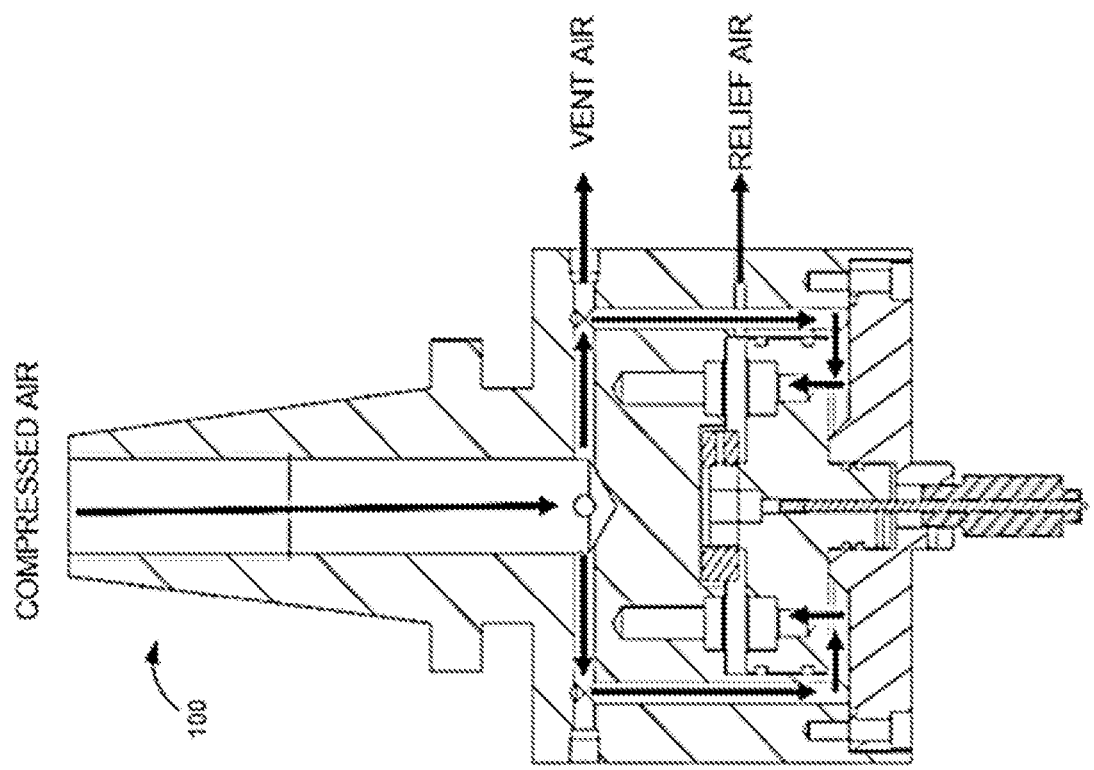
FIG. 12 illustrates an example of a flow of compressed air inside of the modified blank tool holder of the SRTT, according to some embodiments.

In FIG. 12, a main assembly of the example SRTT 100 is shown as a cross section view. Particularly, the example depicts how air can flow into and/or through the modified blank tool holder 105 and allow the piston (shown in FIG. 1A), and the retractable tool tip (shown in FIG. 1A), to be pushed up. For example, examples of paths for compressed air, vent air, and relief air as they flow through holes and/or the body of the modified tool holder 105 are shown.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A swappable retractable tool tip system, comprising:
a blank tool holder;
a piston received by the blank tool holder; and
a retractable tool tip tool tip assembled into the piston and fixed into the piston through a set screw such that the retractable tool tip is removable, and received by the blank tool holder with the piston, wherein the blank tool holder is configured such that air flows into the blank tool holder to effectuate movement of the piston and the retractable tool tip.

2. The system of claim 1, wherein the movement of the piston and the retractable tool tip comprises pushing up on the piston and the retractable tool tip such that the retractable tool tip retracts into a position inside of the blank tool holder.

3. The system of claim 2, wherein the position of the retractable tool tip inside of the blank tool holder comprises a home state.

4. The system of claim 1, further comprises:
multiple springs and dowel pins coupled to the piston.

5. The system of claim 4, wherein the springs are configured to compress such that the springs effectuate movement of the piston and the retractable tool tip.

6. The system of claim 5, wherein movement of the retractable tool tip comprises pushing down on the piston and the retractable tool tip such that the retractable tool tip extends into a position outside of the blank tool holder.

7. The system of claim 6, wherein the position of the retractable tool tip outside of the blank tool holder comprises an extended state.

8. The system of claim 1, further comprising a cover plate coupled to the blank tool holder, wherein the cover plate is configured such that the system is enclosed.

9. The system of claim 8, further comprising a shoulder coupled to the retractable tool tip and fixedly coupled to the cover plate such that the retractable tool tip is received by the blank tool holder.

10. The system of claim 9, wherein the shoulder comprises a through hole configured for movement of the retractable tool tip to retract inside of the blank tool holder and to extend outside of the blank tool holder.

11. The system of claim 4, wherein the multiple springs and dowel pins guide and lock the piston in place during the friction stir welding process.

12. The system of claim 1, wherein the air that flows into the blank tool holder comprises compression air.

13. The system of claim 1, wherein the compressed air is generated by a Computer Numerical Control (CNC) machine.

14. A method, comprising:
assembling a swappable retractable tool tip (SRTT) assembly with a retractable tool tip, wherein assembling comprises assembling the retractable tool tip into a piston such that the retractable tool tip is removable, and a blank tool holder receiving the retractable tool tip and the piston such that air flows into the blank tool holder to effectuate movement of the retractable tool tip.

15. The method of claim 14, further comprising:
swapping the retractable tool tip assembled with the SRTT with an additional retractable tool tip, wherein swapping comprises removing the retractable tool tip from the piston and the additional retractable tool tip has dimensions differing from dimensions of the retractable tool tip.

* * * * *